United States Patent

[11] 3,603,903

[72] Inventor Leon O. Chua
West Lafayette, Ind.
[21] Appl. No. 732,403
[22] Filed May 27, 1968
[45] Patented Sept. 7, 1971
[73] Assignee Purdue Research Foundation

[54] LINEAR ACTIVE NETWORK DEVICE FOR TRANSFORMING ONE CLASS NONLINEAR DEVICES INTO ANOTHER
14 Claims, 15 Drawing Figs.

[52] U.S. Cl. .......... 333/80 R, 307/295, 330/26
[51] Int. Cl. .......... H03h 7/00, H03h 11/00
[50] Field of Search .......... 333/80, 80 T, 1, 24.1

[56] References Cited
UNITED STATES PATENTS
3,001,157 9/1961 Sipress et al. .......... 333/80

*Primary Examiner*—Herman Karl Saalbach
*Assistant Examiner*—Paul L. Gensler
*Attorney*—John R. Nesbitt ABSTRACT: A linear active two-port network element for synthesizing nonlinear network components with arbitrarily prescribed characteristics. The elements, by themselves or in combination, can be utilized for a variety of applications, and are particularly useful in integrated circuit technology. The element included herein is the Mutator. The Mutator essentially transforms, or mutates one class of nonlinear devices into another; for example, a nonlinear resistor may be changed to a nonlinear inductor, a nonlinear inductor to a nonlinear capacitor, a nonlinear capacitor to a nonlinear resistor, and so on.

(a) PRACTICAL REALIZATION OF AN L-R MUTATOR

CHARACTERIZATION AND REALIZATION OF MUTATORS

INVENTOR.
LEON O. CHUA
BY John R. Nesbitt
ATTORNEY (a) PRACTICAL REALIZATION OF AN L-R MUTATOR (b) PRACTICAL REALIZATION OF A C-R MUTATOR

TWO PRACTICAL CIRCUITS FOR REALIZING AN L-R MUTATOR AND A C-R MUTATOR

INVENTOR.
LEON O. CHUA
BY John R. Nesbitt
ATTORNEY

PRACTICAL REALIZATION OF A VOLTAGE-CONTROLLED CURRENT SOURCE

INVENTOR.
LEON O. CHUA

BY John R. Nesbitt
ATTORNEY

FIG. 6

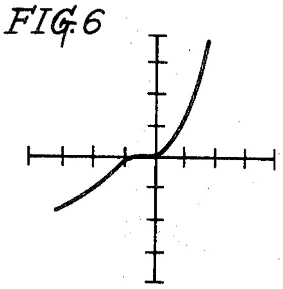

VERTICAL SCALE: = 1 MILLIWEBER PER DIV.
HORIZONTAL SCALE: I = 0.5 ma PER DIV.

FIG. 5

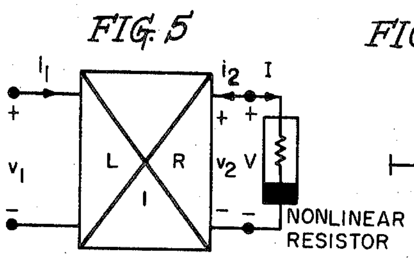

FIG. 7

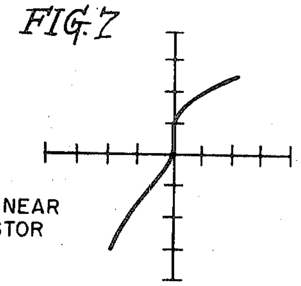

VERTICAL SCALE: I = 0.5 ma PER DIV.
HORIZONTAL SCALE: V = 1 VOLT PER DIV.

(a). A NONLINEAR INDUCTOR CAN BE SYNTHESIZED BY CONNECTING A NONLINEAR RESISTOR ACROSS PORT TWO OF AN L-R MUTATOR

FIG. 9

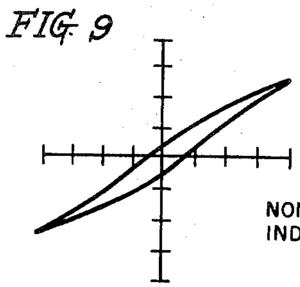

VERTICAL SCALE: = 1 MILLIWEBER PER DIV.
HORIZONTAL SCALE: I = 2 ma PER DIV.

FIG. 8

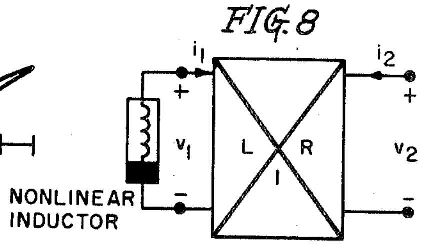

FIG. 10

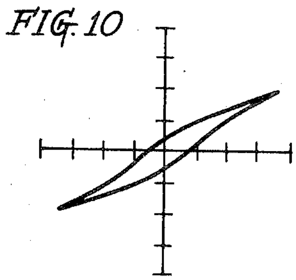

VERTICAL SCALE: V = 0.5 VOLTS PER DIV.
HORIZONTAL SCALE: I = 1ma PER DIV.

(b). A NONLINEAR RESISTOR CAN BE SYNTHESIZED BY CONNECTING A NONLINEAR INDUCTOR ACROSS PORT ONE OF AN L-R MUTATOR

FIG. 12

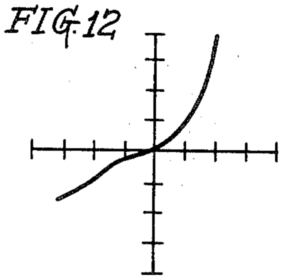

VERTICAL SCALE: Q = 0.1 MICROCOULOMB PER DIV.
HORIZONTAL SCALE: V = 1 VOLT PER DIV.

FIG. 11

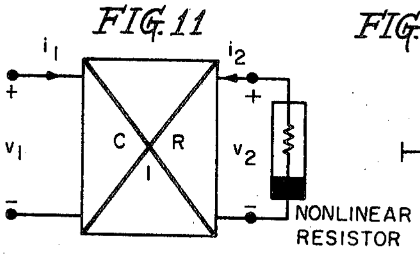

FIG. 13

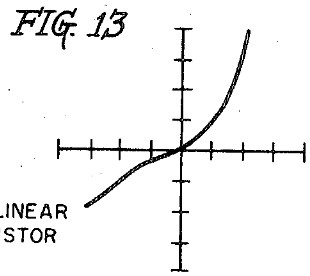

VERTICAL SCALE: I = 1ma PER DIV.
HORIZONTAL SCALE: V = 1 VOLT PER DIV.

(c). A NONLINEAR CAPACITOR CAN BE SYNTHESIZED BY CONNECTING A NONLINEAR RESISTOR ACROSS PORT TWO OF A C-R MUTATOR.

SCOPE TRACINGS DEMONSTRATING THE TRANSFORMATION OF ONE TYPE OF NONLINEAR ELEMENT INTO ANOUTHER TYPE BY A MUTATOR

INVENTOR.
LEON O. CHUA
BY John R. Nesbitt
ATTORNEY

LINEAR ACTIVE NETWORK DEVICE FOR TRANSFORMING ONE CLASS NONLINEAR DEVICES INTO ANOTHER

FIELD OF THE INVENTION

This invention relates to an active two-port network element for realizing nonlinear network components with arbitrarily prescribed characteristics.

DESCRIPTION OF THE PRIOR ART

A basic problem has existed in the electronics field both in nonavailability of devices or components capable of performing a desired function, and in nonavailability of devices or components which are suitable for a desired function or usage. For example, a basic problem has heretofore existed in realizing a nonlinear resistor, inductor, or capacitor with a prescribed Voltage-Current (V–I), Flux-Linkage-Current (Φ–I), or Charge-Voltage (Q–V) curve. In addition, in connection with integrated circuits, many problems have arisen, including, for example, the necessity for practical inductorless circuits. These, and other, unsolved problems have made it necessary to seek new "building blocks" to enable the realization of components or devices which will exhibit the desired characteristics and yet be suitable for usage in the contemplated manner.

The widespread application of computers in network analysis and optimization problems and the phenomenal progress in integrated circuit technology over the past few years have removed, as well as introduced, many new circuit constraints which have hitherto been regarded as purely academic. In the case of computer applications, for example, it is now possible to specify a set of desired network functions and let the computer select the optimum values of a set of linear resistors, inductors, and capacitors so that the deviations of the resulting network's performance from the desired specification are minimized. However, in view of the limited capability of such linear elements, the resulting optimum linear network may still be far from satisfactory because the deviations can still be significant. Under this condition, it is necessary to enlarge the class of allowable network elements to include nonlinear resistors, inductors, and capacitors. Since the class of linear elements is a subset of this large class, it is clear that the optimized network should be at least as good, if not better, than the linear case. In other words, given two networks with the same topology, an optimum choice of nonlinear elements will in general out-perform an optimum choice of linear elements. Conversely, given two networks for realizing identical functions (one using nonlinear elements, and the other using only linear elements), the nonlinear version should in general require a smaller number of network elements.

Since the nonlinear elements that exist in their natural form have characteristic curves which are governed by the physical properties of the materials composing the elements, it is to be expected that the I–V, Φ–I, and Q–N curves as required by an optimum network will not be commercially available. Hence, before one can realize an optimum nonlinear network, it is necessary to synthesize a nonlinear resistor, inductor, or capacitor with a prescribed I–V, Φ–I, or Q–V curve, using only commercially available components as building blocks. This fundamental problem is often referred to as the nonlinear element realization problem.

Before the advent of integrated circuits, the nonlinear element realization problem was rather academic because it was difficult to combine many discrete components without introducing an excessive amount of parasitics. Moreover, since active elements are usually required, the amount of power dissipation could be prohibitive. Even if these difficulties can be circumvented, the physical size of the synthesized element would be too bulky. These practical considerations can now be overcome by using integrated circuits. It is no longer unrealistic to think of a nonlinear element made up of a few dozen resistors, zener diodes and transistors because the finished size of the integrated circuit need not be larger than the present discrete components. Hence, the parallel development of computer optimization techniques and integrated circuit technology has rendered the nonlinear element realization problem a rather pressing one.

There are several techniques available for realizing a nonlinear resistor with a prescribed monotonic I–V curve. However, little is known for realizing a nonlinear inductor or a nonlinear capacitor. Unlike in the case of nonlinear resistors, only a few types of nonlinear inductors (iron-core inductors, for example) and nonlinear capacitors (barium-titanate dielectric capacitors, for example) are available as basic building blocks. The difficulty is further aggravated by the fact that most of these elements exhibit some hysteresis characteristics, thus making them virtually useless as building blocks.

SUMMARY OF THE INVENTION

This invention provides a solution to many of the problems now existing in the electronics field through the introduction of linear active two-port network elements and combinations thereof heretofore unknown. Through the use of these network elements, prescribed nonlinear components can be realized that were heretofore unobtainable.

It is an object of this invention to provide a new two-port network element for realizing nonlinear components with heretofore unobtainable prescribed characteristics.

It is yet another object of this invention to provide a new two-port network element for realizing a prescribed resistor, capacitor, or inductor.

With these and other objects in view which will become apparent to one skilled in the art as the description proceeds, this invention resides in a novel construction combination and arrangements of parts substantially as hereinafter described and more particularly defined by the appended claims, it being understood that such changes in the precise embodiments of the herein disclosed invention may be included as come within the scope of the claims.

FIG. 1A, 1B, and 1C, constitute a table of mutator characterization and realization:

FIG. 5 is a circuit representation showing the synthesis of a nonlinear inductor by connecting a nonlinear resistor across port 2 of an L–R mutator;

FIGS. 6 and 7 are I–Φand V–I graphical illustrations with respect to the circuit of FIG. 5;

FIG. 8 is a circuit representation showing the synthesis of a nonlinear resistor by connecting a nonlinear inductor across port 1 of an L–R mutator;

FIGS. 9 and 10 are I–Φand I–V graphical illustrations with respect to the circuit of FIG. 8.

FIG. 11 is a circuit representation showing the synthesis of a nonlinear capacitor by connecting a nonlinear resistor across port 2 of a C–R mutator.

FIGS. 12 and 13 are V–Q and V–I graphical illustrations with respect to the circuit of FIG. 11.

In the science of genetics, one sometimes witnesses the mutation of one "specie" into another specie of a completely different structure. In network theory, there are three species; namely, resistors, inductors, and capacitors. These species are characterized, respectively, by a curve in the I–V, Φ–I, or Q–V plane, and are therefore fundamentally different in structure. It is possible to mutate a nonlinear resistor, inductor, or capacitor into one another by means of a two-port network called the mutator.

If we let $X_1$ or $X_2$ denote either a resistor, an inductor, or a capacitor, we can formally define an "$X_1$–$X_2$ Mutator" to be a two-port network with the property that if an $X_1$-element is connected across port 1, the resulting two-terminal element across port 2 becomes an $X_2$-element. Conversely, if an $X_2$- element is connected across port 2, the resulting two-terminal element across port 1 becomes an $X_1$-element. Depending on the specie that $X_1$and $X_2$stand for, it is convenient to define three classes of mutators; namely, an L–R Mutator, a C–R Mutator, and an L–C Mutator. Only the L–R Mutator is discussed in detail herein since the remaining two classes can be developed by an analogous procedure.

To define a L–R Mutator, it suffices to transform each point $P_1(\Phi_{1a}{}'_1)$ in the $\Phi_1$–$I_1$plane into a corresponding point $P_2(V_2,-I_2)$, or $P_2(-I_2, V_2)$, in the $I_2$–$V_2$plane, and vice versa. Accordingly, there are two types of L–R Mutators, and the corresponding two-port networks are described by:

Type 1: $V_1=dV_2/dt, I_1=-I_2$ (M1)

In the frequency (P) domain, equation (M1) is best represented by the transmission matrix $$\underset{\sim}{T}_{LR_1}(P)=\begin{bmatrix} P & 0 \\ 0 & 1 \end{bmatrix} \qquad (M2)$$

Type 2: $V_1=-dI_2/dt, I_1=V_2$ (M3) Equation (M3) can be represented by the transmission matrix $$\underset{\sim}{T}_{LR_2}(P)=\begin{bmatrix} 0 & P \\ 1 & 0 \end{bmatrix} \qquad (M4)$$

Figures 1A, 1B:
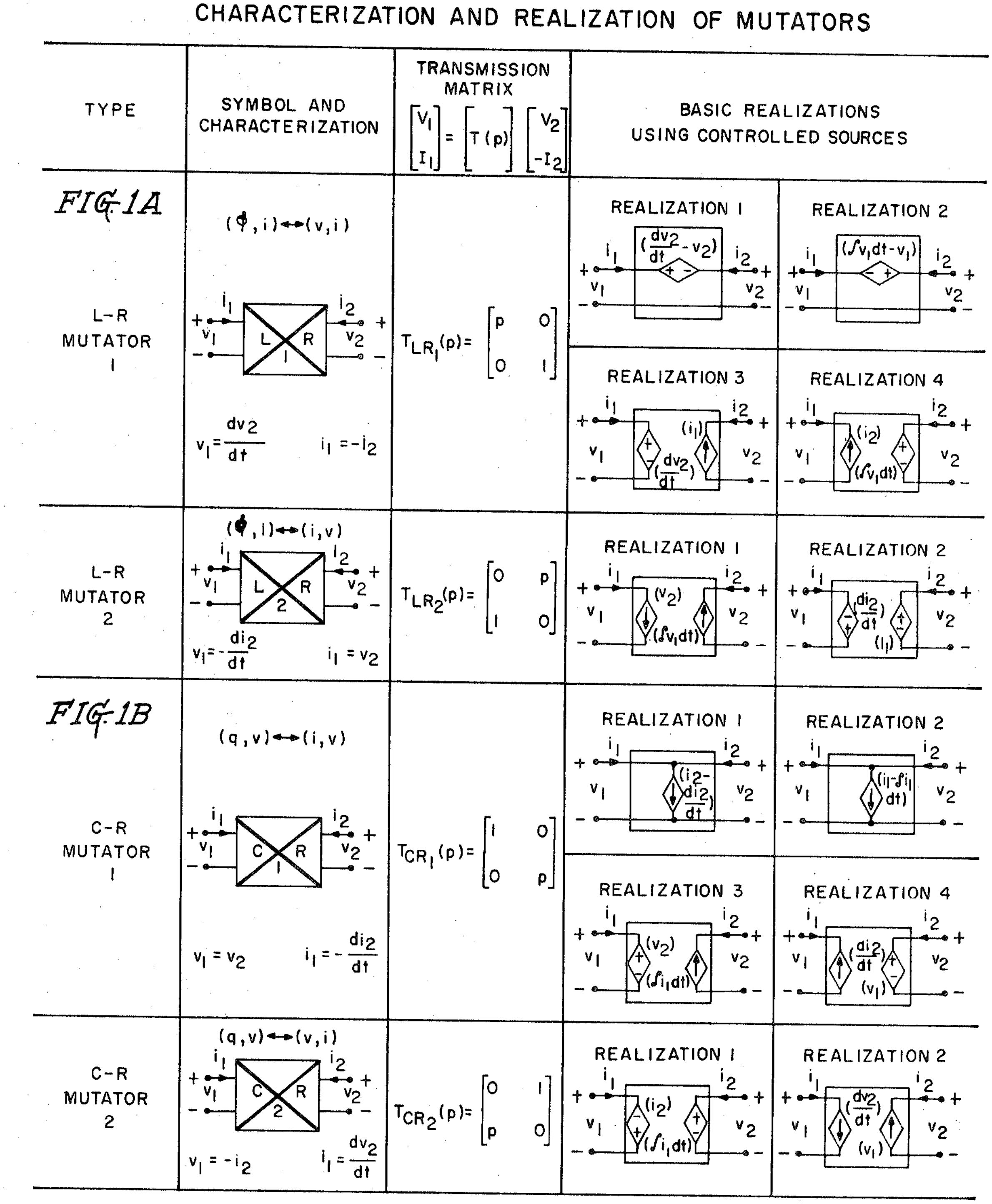
Figure 1C:
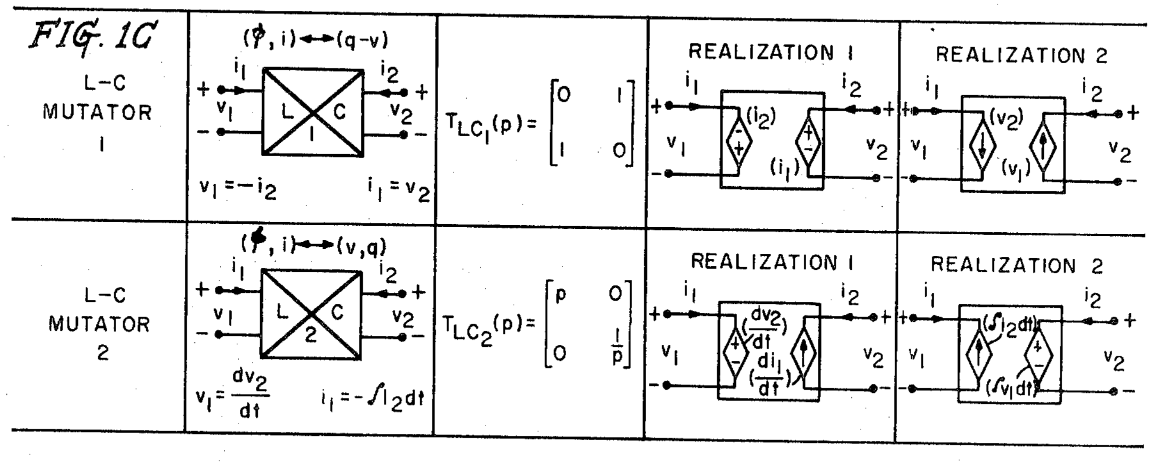

By an analogous procedure it can be found that there are two types of C–R Mutators, and two types of L–C Mutators. The complete characterization and symbols for each of the six types of mutators are shown in FIG. 1 (*a*), (*b*), and (*c*).

Figure 3:
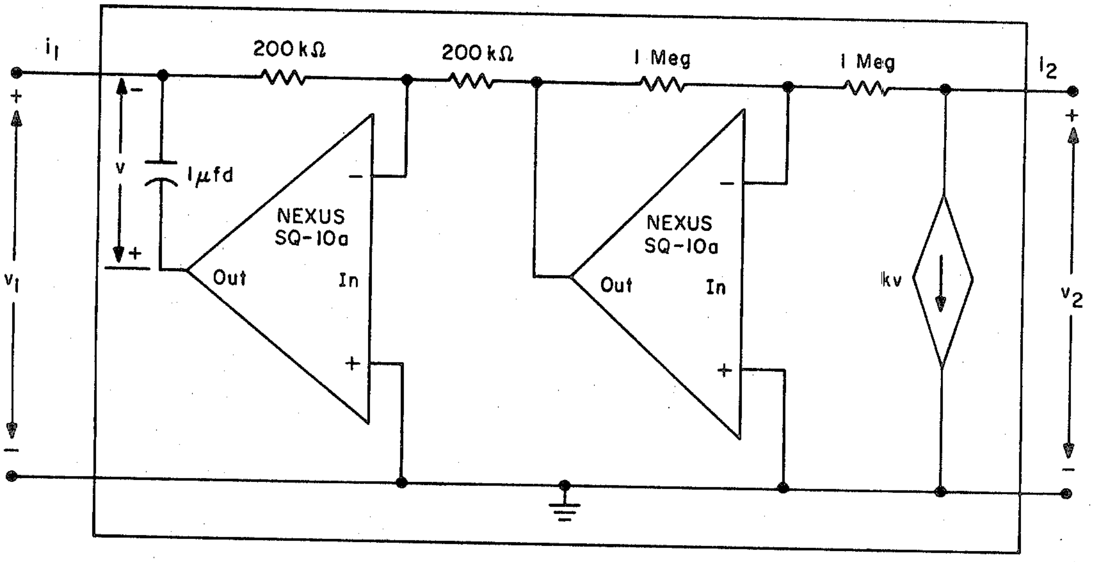
FIG. 3 is a circuit diagram of a C–R mutator.
Figure 4:
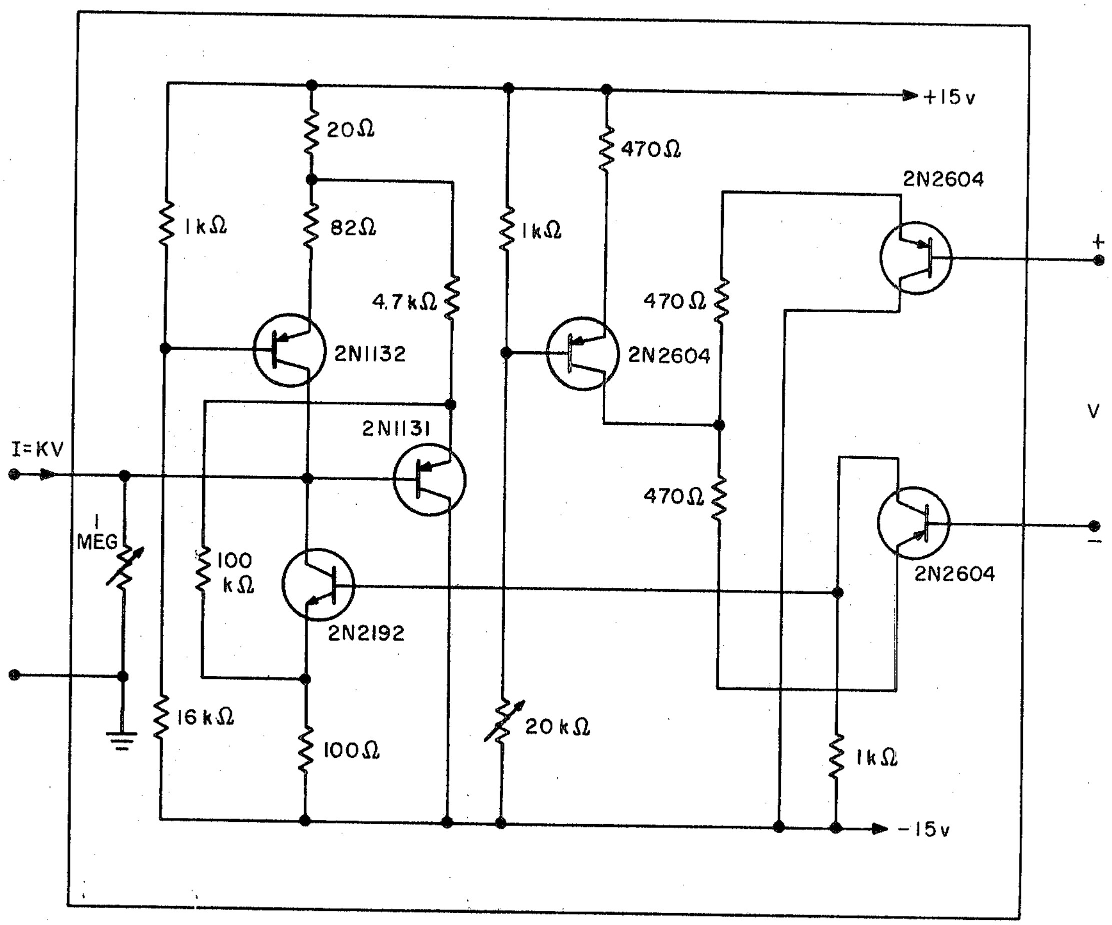
FIG. 4 is a schematic circuit diagram of an inductorless voltage control current source used in the mutator circuits.

Each of the mutators can be realized by either one or two controlled sources whose terminal variable is controlled in general by the time derivative or integral of the port variables. Controlled sources, also known as dependent sources, are known in the art and can be realized either by various operational amplifier circuits or by appropriate transistor circuits designed by state of the art techniques. For further explanation of such a controlled source, see Kendall Su, *Active Network Synthesis*, McGraw-Hill Book Company, (1965), or *Handbook of Operational Amplifier Active RC Networks*, Burr-Brown Research Corporation, Tucson, Ariz., Chapter 4, (1966). Several possible realizations are shown in FIG. 1 for each type of mutator. The controlled sources can be realized by an appropriate combination of active elements, and these sources are denoted by diamond symbols indicating plus-minus polarities for controlled voltage sources and arrows for controlled current sources. Each of the basic realizations shown in FIG. 1 has been simulated with practical circuits with the best results for a Type 1L–R Mutator being obtained by simulating realization 4 with the practical circuit shown in FIG. 2. A somewhat analogous practical realization for a Type 1C–R Mutator is shown in FIG. 3, which simulates realization 3 of FIG. 1B under C–R Mutator 1. In both circuits, a voltage-controlled current source is necessary and such a source can be, for example, as shown in FIG. 4. In like manner, the other basic realizations shown in FIG. 1 for L–R Mutators, C–R Mutators, and L–C Mutators may be readily simulated by known prior art controlled sources and components in the same manner as set forth hereinabove by following the teaching of each realization in connecting the known controlled sources and components to achieve the end taught by the realization as shown.

In FIG. 4 the independent variable is the voltage V applied to the right input terminals. The dependent variable is the current I which flows into the top left terminal and out of the bottom left terminal. Thus the left terminals are output terminals.

The legend $I=KV$ means that the output current $I$ flowing into the top left output terminal is directly proportional to the voltage $V$ at the right input terminals. Thus, if the constant of proportionality is 0.001 amperes/volt, and if the top right input terminal was at −3 volts with respect to ground reference potential, and if the bottom right input terminal was at −4 volts with respect to ground reference potential, then a current of 1 milliampere would flow into the top left output terminal and out of the bottom left output terminal.

The two rightmost transistors are in a push-pull connection in which the two emitters receive, from the transistor 2N2604 located near the center, current biases whose sum is constant. The connection operates to produce on the horizontal output line which leads to the base of the transistor 2N2192 a voltage which is proportional to V, and independent of the absolute level of V above ground reference potential. Thus, the voltage V at the right input port may "float," with respect to ground, without affecting the output current at the left port, provided only that the "float" does not get near the limits imposed by the +15 and −15 volt bias source. The three transistors at the left of the circuit are connected to operate as an inverter and as a current source. The inverter function is needed because when the topmost terminal of the right input port goes more positive, the current drawn into the topmost terminal of the left output port must increase, so that the last-mentioned terminal must appear more negative to the external circuitry. The two concatenated transistors 2N1132 and 2N2192opera te as constant current sources because their respective bases receive approximately a fixed (for transistor 2N1132) and a fixed but controllable by V (for transistor 2N2192) respective base bias current. Under the circumstances, the collector currents of the two transistors are relatively constant, despite variations in collector voltage, and the current I at the left output port is equal to the difference between the two collector currents. The transistor 2N1131 provides bootstrapping or positive feedback to the lower constant current transistor 2N2192 through a 100 kilo-ohm resistor, thereby making making the apparent collector impedances higher, thereby providing an output current event more independent of output load. The adjustable 20 kilo-ohm resistor at the middle of the figure controls the constant current bias supplied by the central transistor 2N2604 to the push-pull pair at the right, and therefore controls the gain of the system, which controls the rate at which the current I at the left output terminals varies with the voltage V at the right input terminals. A condition 0 offset is achieved between 0 voltage at the right input terminals and 0 current at the left output terminals, by adjusting the upper left 1 kilo-ohm resistor to achieve this result. The two transistors (2N2192 and 2N113), connected in bootstrap configuration with the value of coupling resistors and loads shown in the figure, exhibit, at the right output terminals, a negative resistance having a value between 0 and −1 megohm. The 1 megohm variable resistor at the left of the figure is adjusted to slightly more than cancel out the said negative resistance, thereby rendering the internal impedance at the left output terminals near infinite and stabilizing the constant current supplied by the output terminals. The resistance is near infinite rather than near zero because the resistors are in parallel and therefore their conductance, rather than their resistance, should be added. Further, there is a mathematical singularity involved in adding opposite but exactly equal admittances (analogous to dividing by zero) so that a negative admittance should be cancelled by a slightly larger positive admittance, both in the real circuit and in the calculation.

Figure 2:
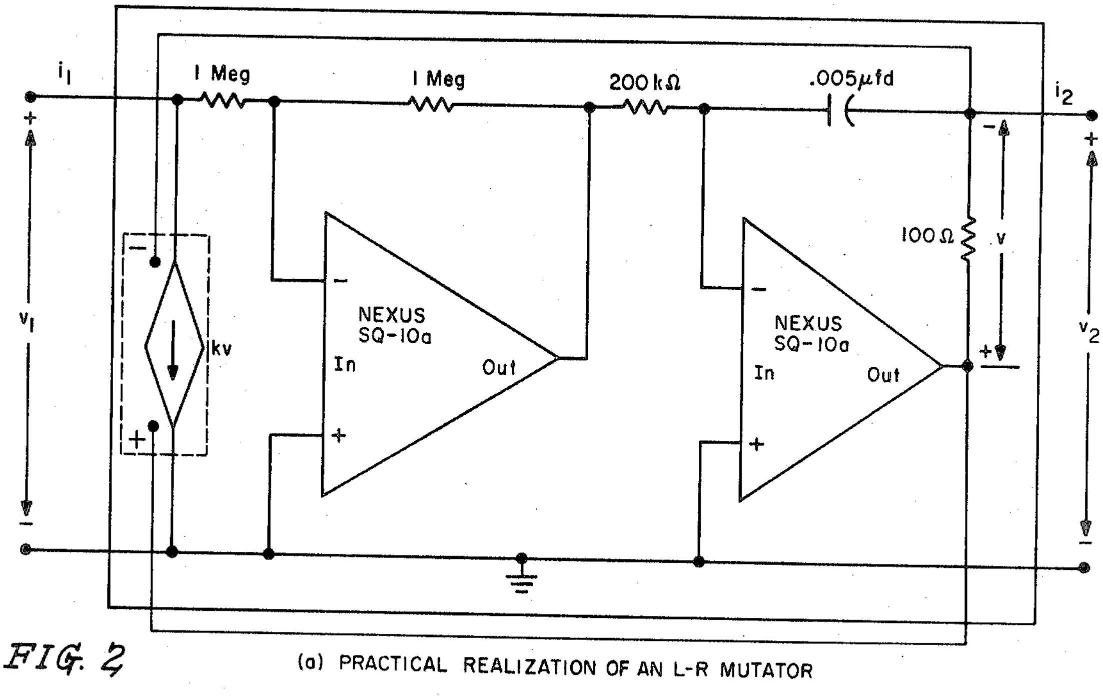
FIG. 2 is a circuit diagram of an L–R mutator.

The 100 ohm resistor shown to the right of FIG. 2, across which the voltage V is developed, functions to "sense" the current $I_2$ in view of the observation that the voltage V is approximately equal to $-100$ ($i_2$) since the current passing through the capacitor is negligible composed to $i_2$. Consequently, the voltage controlled current source at the left of FIG. 2 is equivalent to a current controlled current source with terminal current equal to $KV=K(-100\ i_2)$, as required by the realization 4 of FIG. 1A. This use of the resistor as described is a standard technique in the art.

In order to demonstrate the practicality of mutators, many circuits have been designed and verified experimentally. FIG. 5 shows a typical nonlinear resistor connected across port 2 of a Type 1 L–R Mutator, and FIGS. 6 and 7 show, by graph, the Φ–I curve of the resulting inductor and the I–V curve, respectively. In order to demonstrate that a mutator works in either direction, a nonlinear inductor with a Φ–I hysteresis curve as shown in FIG. 9 is connected across port 1 of a mutator, as shown in FIG. 8 (which mutator is the same as shown in FIG. 5), and the resulting I–V curve is shown in FIG. 10 where, for comparison purposes, this I–V curve is traced with voltage as the vertical axis. Finally, FIG. 11 shows the mutation of a nonlinear resistor into a nonlinear capacitor having the same characteristic curve, as can be seen from a comparison of the graphs of FIGS. 12 and 13. Since a Type 1 LC-Mutator is simply a gyrator, whose properties are now well known, no scope tracing has been set forth for this type of mutator.

The graphs of FIGS. 6, 7, 9, 10, 12 and 13 were obtained with specially designed I–V, Φ–I, and Q–V curve tracers, and, due to the frequency limitation of the operational amplifiers, the frequency utilized was relatively low (around 5 kilohertz). It must be emphasized, however, that frequency limitations are not inherent in the mutator, but depend instead on the frequency characteristics of the active elements. Therefore, a high frequency mutator can be realized by using high frequency active components.

Although mutators were conceived primarily for realizing nonlinear elements, there is considerable interest in developing a linear inductor by connecting a linear resistor across port 2 of an L–R Mutator, and experimental results have confirmed the usefulness of this approach. The basic limitation at present has been the frequency characteristics of the resulting inductor, which can, of course, be improved by using high frequency mutators. Utilizing the low frequency characteristic, large valued inductors have been realized with much higher Q than those available in commercial inductors. It is also possible to realize a pair of mutual inductance by connecting a T-network (containing three resistors) between two L–R Mutators.

Thus, this new element provides a set of basic building blocks for realizing arbitrarily prescribed resistors, inductors, and capacitors. As a result, the design of a practical nonlinear circuit is no longer an academic problem.

What is claimed is:

1. A linear active two port network device comprising a single voltage-controlled voltage source between port 1 and port 2 with terminal voltage equal to $v=dv_2/dt-v_2$ where $v_2$ is the voltage at port 2, forming a two-port network such that a nonlinear resistor with a predetermined characteristic curve connected across port 2, causes a nonlinear inductor with the same characteristic curve to be realized across port 1 and a nonlinear inductor with a predetermined characteristic curve connected across port 1 causes a nonlinear resistor with the same characteristic curve to be realized across port 2.

2. A linear active network device comprising a single voltage-controlled voltage source between port 1 and port 2 with terminal voltage equal to $v=\int v_1\, d-v_1$ where $v_1$ is the voltage at port 1, forming a two-port network such that a nonlinear resistor with a predetermined characteristic curve connected across port 2 causes a nonlinear inductor with the same characteristic curve to be realized across port 1 and a nonlinear inductor with a predetermined characteristic curve connected across port 1 causes a nonlinear resistor with the same characteristic curve to be realized across port 2.

3. A linear active network device comprising a voltage-controlled voltage source with terminal voltage equal to $v_1=dv_2/dt$ across port 1, where $v_1$ and $v_2$ are the voltages at ports 1 and 2, respectively, and a current-controlled current source with terminal current $i_2=-i_1$ across port 2, where $i_1$ and $i_2$ are the currents at ports 1 and 2, respectively, forming a two-port network such that a nonlinear resistor with a predetermined characteristic curve connected across port 2, causes a nonlinear inductor with the same characteristic curve to be realized across port 1 and a nonlinear inductor with a predetermined characteristic curve connected across port 1 causes a nonlinear resistor with the same characteristic curve to be realized across port 2.

4. A linear active network device comprising a current-controlled current source with terminal current equal to $i_1=-i_2$ across port 1, where $i_1$ and $i_2$ are the currents at ports 1 and 2, respectively, and a voltage-controlled voltage source with terminal voltage $v_2=\int v_1dt$ across port 2, where $v_1$ and $v_2$ are the voltages at ports 1 and 2, respectively, forming a two-port network such that a nonlinear resistor with a predetermined characteristic curve connected across port 2, causes a nonlinear inductor with the same characteristic curve to be realized across port 1 and a nonlinear inductor with a predetermined characteristic curve connected across port 1 causes a nonlinear resistor with the same characteristic curve to be realized across port 2.

5. A linear active network device comprising a voltage-controlled current source with terminal current equal to $i_1=v_2$ across port 1, where $i_1$ and $v_2$ are the currents and voltages at ports 1 and 2, respectively and a voltage-controlled current source with terminal current equal to $i_2=\int -v_1dt$ across port 2, where $v_1$ and $i_2$ are the voltages and currents at ports 1 and 2, respectively, forming a two-port network such that a nonlinear resistor with a predetermined characteristic curve connected across port 2, causes a nonlinear inductor with the same characteristic curve to be realized across port 1 and a nonlinear inductor with a predetermined characteristic curve connected across port 1 causes a nonlinear resistor with the same characteristic curve to be realized across port 2.

6. A linear active network device comprising a current-controlled voltage source with terminal voltage equal to $v_1=-di_2/dt$ across port 1, where $v_1$ and $i_2$ are the voltages and currents at ports 1 and 2, respectively, and a current-controlled voltage source with terminal voltage $v_2=i_1$ across port 2, where $i_1$ and $v_2$ are the currents and voltages at ports 1 and 2, respectively forming a two-port network such that a nonlinear resistor with a predetermined characteristic curve connected across port 2 causes a nonlinear inductor with the same characteristic curve to be realized across port 1 and a nonlinear inductor with a predetermined characteristic curve connected across port 1 causes a nonlinear resistor with the same characteristic curve to be realized across port 2.

7. A linear active network device comprising a single current-controlled current source across port 1 and port 2 with terminal current equal to $i=i_2\ di_2/dt$, where $i_2$ is the current at port 2, forming a 2 port network such that a nonlinear resistor with a predetermined characteristic curve connected across port 2, causes a nonlinear capacitor with the same characteristic curve to be realized across port 1 and a nonlinear capacitor with a predetermined characteristic curve connected across port 1 causes a nonlinear resistor with the same characteristic curve to be realized across port 2.

8. A linear active network device comprising a single current-controlled current source across port 1 and port 2 with terminal current equal to $i=i_1\ \int i_1dt$, where $i_1$ is the current at port 1, forming a 2 port network such that a nonlinear resistor with a predetermined characteristic curve connected across port 2, causes a nonlinear capacitor with the same characteristic curve to be realized across port 1 and a nonlinear capacitor with a predetermined characteristic curve connected across port 1 causes a nonlinear resistor with the same characteristic curve to be realized across port 2.

9. A linear active network device comprising a voltage-controlled voltage source with terminal voltage equal to $v_1=v_2$ across port, where $v_1$ and $v_2$ are the voltages at ports 1 and 2, respectively, and current-controlled current source with terminal current $i_2=\int -i_1dt$ across port 2, where $i_1$ and $i_2$ are the currents at ports 1 and 2, respectively, forming a two-port network such that a nonlinear resistor with a predetermined characteristic curve connected across port 2 causes a nonlinear capacitor with the same characteristic curve to be realized across port 1 and a nonlinear capacitor with a predetermined characteristic curve connected across port 1 causes a nonlinear resistor with the same characteristic curve to be realized across port. 2.

10. A linear active network device comprising a current controlled current source with terminal current $i_1=-di_2/dt$ across port 1, where $i_1$ and $i_2$ are the currents at ports 1 and 2, respectively, and a voltage- controlled voltage source with terminal voltage equal to $v_2=v_1$ across port 2, where $v_1$ and $v_2$ are the voltages at ports 1 and 2, respectively, forming a two-port network such that a nonlinear resistor with a predetermined characteristic curve connected across port 2 causes a nonlinear capacitor with the same characteristic curve to be realized across port 1 and a nonlinear capacitor with a predetermined characteristic curve connected across port 1 causes a nonlinear resistor with the same characteristic curve to be realized across port 2.

11 A linear active network device comprising a current-controlled voltage source with terminal voltage $v_1=-i_2$ across port 1, where $v_1$ and $i_2$ are the voltages and currents at ports 1 and 2, respectively, and a current-controlled voltage source with terminal voltage $v_2=\int i_1\,dt$ across port 2, where $i_1$ and $v_2$ are the currents and voltages at ports 1 and 2, respectively, forming a two-port network such that a nonlinear resistor with a predetermined characteristic curve connected across port 2, causes a nonlinear capacitor with the same characteristic curve to be realized across port 1 and a nonlinear capacitor with a predetermined characteristic curve connected across port 1 causes a nonlinear resistor with the same characteristic curve to be realized across port 2.

12. A linear network device comprising a voltage-controlled current source with terminal current equal to $i_1=dv_2/dt$ across port 1, where $i_1$ and $v_2$ are the currents and voltages at ports 1 and 2, respectively, and a voltage-controlled current source with terminal current $i_2=v_1$ across port 2, where $v_1$ and $i_2$ are the voltages and currents at ports 1 and 2, respectively, forming a two-port network such that a nonlinear resistor with a predetermined characteristic curve connected across port 2, causes a nonlinear capacitor with the same characteristic curve to be realized across port 1, and a nonlinear capacitor with a predetermined characteristic curve connected across port 1 causes a nonlinear resistor with the same characteristic curve to be realized across port 2.

13. A linear active network device comprising a voltage-controlled voltage source with terminal voltage $v_1=dv_2/dt$ across port 1, where $v_1$ and $v_2$ are the voltages at ports 1 and 2, respectively, and a current-controlled current source with terminal current $i_2=-di_1/dt$ across port 2, where $i_1$ and $i_2$ are the currents at ports 1 and 2, respectively, forming a two-port network such that a nonlinear capacitor with a predetermined characteristic curve connected across port 2, causes a nonlinear inductor with the same characteristic curve to be realized across port 1 and a nonlinear inductor with a predetermined characteristic curve connected across port 1 causes a nonlinear capacitor with the same characteristic curve to be realized across port 2.

14. A linear active network device comprising a current-controlled current source with terminal current equal to $i_1=-\int i_2 dt$ across port 1, where $i_1$ and $i_2$ are the currents at ports 1 and 2, respectively, and a voltage-controlled voltage source with terminal voltage $v_2=\int v_1 dt$ across port 2, where $v_1$ and $v_2$ are the voltages at ports 1 and 2, respectively, forming a two-port network such that a nonlinear capacitor with a predetermined characteristic curve connected across port 2, causes a nonlinear inductor with the same characteristic curve to be realized across port 1 and a nonlinear inductor with a predetermined characteristic curve connected across port 1 causes a nonlinear capacitor with the same characteristic curve to be realized across port 2